(12) United States Patent
Miyamoto

(10) Patent No.: US 9,118,264 B2
(45) Date of Patent: Aug. 25, 2015

(54) PIEZOELECTRIC MOTOR, DRIVE CIRCUIT, AND DRIVE METHOD

(71) Applicant: SEIKO EPSON CORPORATION, Tokyo (JP)

(72) Inventor: Tsutomu Miyamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/800,913

(22) Filed: Mar. 13, 2013

(65) Prior Publication Data

US 2013/0278110 A1 Oct. 24, 2013

(30) Foreign Application Priority Data

Apr. 18, 2012 (JP) ................. 2012-094975

(51) Int. Cl.
*H02N 2/14* (2006.01)
*H02N 2/00* (2006.01)
*H02N 2/10* (2006.01)

(52) U.S. Cl.
CPC ................. *H02N 2/14* (2013.01); *H02N 2/004* (2013.01); *H02N 2/103* (2013.01); *H02N 2/145* (2013.01)

(58) Field of Classification Search
CPC ......... H02N 2/004; H02N 2/103; H02N 2/14; H02N 2/145
USPC ................. 310/323.01–323.21, 317
See application file for complete search history.

(56) References Cited

U.S. PATENT DOCUMENTS

| | | | | |
|---|---|---|---|---|
| 5,949,177 A | * | 9/1999 | O'Brien et al. | 310/316.01 |
| 7,834,518 B2 | * | 11/2010 | Wischnewskij et al. | 310/323.13 |
| 7,994,687 B2 | * | 8/2011 | Takeuchi | 310/317 |
| 8,115,366 B2 | * | 2/2012 | Hoffman et al. | 310/316.01 |
| 8,253,304 B2 | * | 8/2012 | Wischnewskij et al. | 310/323.02 |
| 8,274,196 B2 | * | 9/2012 | Kudo et al. | 310/316.01 |
| 2010/0013353 A1 | * | 1/2010 | Wischnewskij et al. | 310/317 |
| 2010/0245518 A1 | | 9/2010 | Matsumoto et al. | |
| 2011/0050035 A1 | * | 3/2011 | Wischnewskiy et al. | 310/317 |
| 2011/0057543 A1 | * | 3/2011 | Adachi | 310/323.02 |
| 2012/0228994 A1 | * | 9/2012 | Wischnewskiy et al. | 310/317 |

FOREIGN PATENT DOCUMENTS

JP 2010-233339 10/2010
WO WO 2011/050784 * 5/2011 ............. H01L 41/09

* cited by examiner

*Primary Examiner* — Derek Rosenau
(74) *Attorney, Agent, or Firm* — Workman Nydegger

(57) ABSTRACT

A piezoelectric motor includes a rotating body, a piezoelectric actuator including a protruding section having contact with the rotating body, and adapted to rotate the rotating body due to a motion of the protruding section when driving a piezoelectric element, and a drive circuit adapted to drive the piezoelectric element, and the drive circuit includes a drive signal generation section adapted to output a drive signal with a predetermined frequency, and an LC filter adapted to block a frequency higher than the predetermined frequency, and applies the drive signal to the piezoelectric element via the LC filter.

12 Claims, 9 Drawing Sheets

COMPARATIVE EXAMPLE

| ROTATIONAL SPEED | HIGH | LOW |
|---|---|---|
| C | 1.006nF | 2.14nF |
| R | 278.6 Ω | 628.3 Ω |
| W | 114.8mW | 50.9mW |

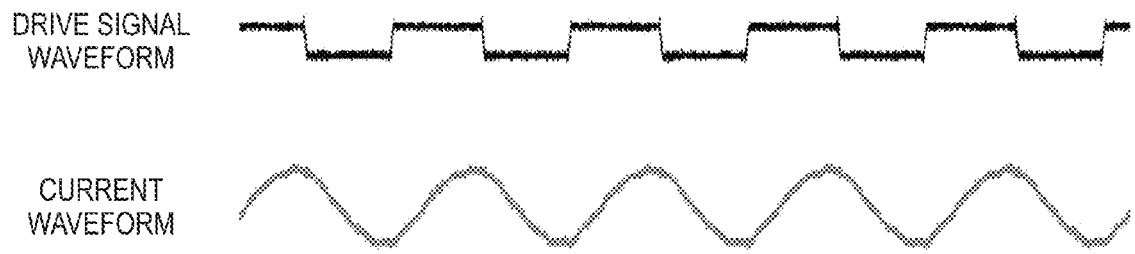
FIG.11A
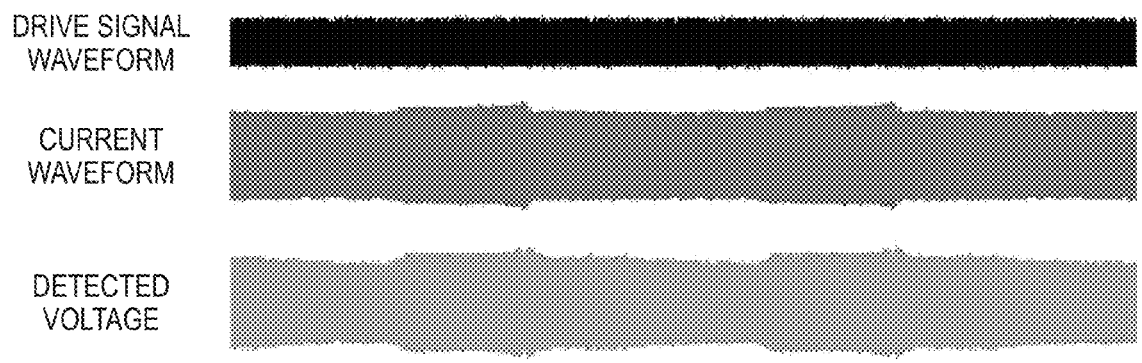
FIG.11B
PRESENT EMBODIMENT
| ROTATIONAL SPEED | HIGH | LOW |
|---|---|---|
| C | 1.006nF | 2.14nF |
| R | 278.6Ω | 628.3Ω |
| X | 2.2V | 5.1V |
| W | 18.1mW | 41.9mW |
FIG.12

PIEZOELECTRIC MOTOR, DRIVE CIRCUIT, AND DRIVE METHOD

BACKGROUND

1. Technical Field

The present invention relates to a piezoelectric motor, a drive circuit, and a drive method.

2. Related Art

A piezoelectric motor is for rotationally driving a rotating body using a piezoelectric actuator provided with a piezoelectric element. The piezoelectric actuator used for the piezoelectric motor is provided with a vibrating member and the piezoelectric element for vibrating the vibrating member. In such a piezoelectric actuator, by applying a voltage to electrodes of the piezoelectric element to thereby longitudinally vibrating and flexurally vibrating the vibrating member, a protruding section provided to an end of the vibrating member is made to perform an elliptic motion. Since the protruding section elliptically moving has contact with a side surface of the rotating body, the rotating body rotates (see JP-A-2010-233339).

In order to make the vibrating member longitudinally vibrate and flexurally vibrate, a sinusoidal voltage is applied to the piezoelectric element to thereby resonate the vibrating member. In contrast, since the piezoelectric motor drives the rotating body while making the protruding section have contact with the side surface of the rotating body, a back electromotive force is caused in the piezoelectric element due to the reactive force by the contact. The inventors of the invention have found out a phenomenon specific to the piezoelectric motor that the current flowing through the piezoelectric element is distorted as a result.

In addition, in the circuit in which the amplitude of the current is reduced when the motional impedance is high, if the rotating body becomes difficult to rotate (i.e., the motional impedance is high), the rotating body becomes more difficult to rotate. Therefore, there is also a problem that the movement of the piezoelectric motor becomes unstable.

SUMMARY

An advantage of some aspects of the invention is to stably drive the piezoelectric motor.

An aspect of the invention is directed to a piezoelectric motor including a rotating body, a piezoelectric actuator including a protruding section having contact with the rotating body, and adapted to rotate the rotating body due to a motion of the protruding section when driving a piezoelectric element, and a drive circuit adapted to drive the piezoelectric element, wherein the drive circuit includes a drive signal generation section adapted to output a drive signal with a predetermined frequency, and an LC filter adapted to block a frequency higher than the predetermined frequency, and applies the drive signal to the piezoelectric element via the LC filter.

Other aspects of the invention will be apparent from the present specification and the accompanying drawings.

BRIEF DESCRIPTION OF THE DRAWINGS

The invention will now be described with reference to the accompanying drawings, wherein like numbers reference like elements.

FIGS. 11A and 11B are explanatory diagrams of waveforms in the drive period in the embodiment.
FIG. 12 is a table of equivalent characteristics corresponding to a rotational speed in the case of the embodiment of the invention.

DESCRIPTION OF AN EXEMPLARY EMBODIMENT

Figure 1:
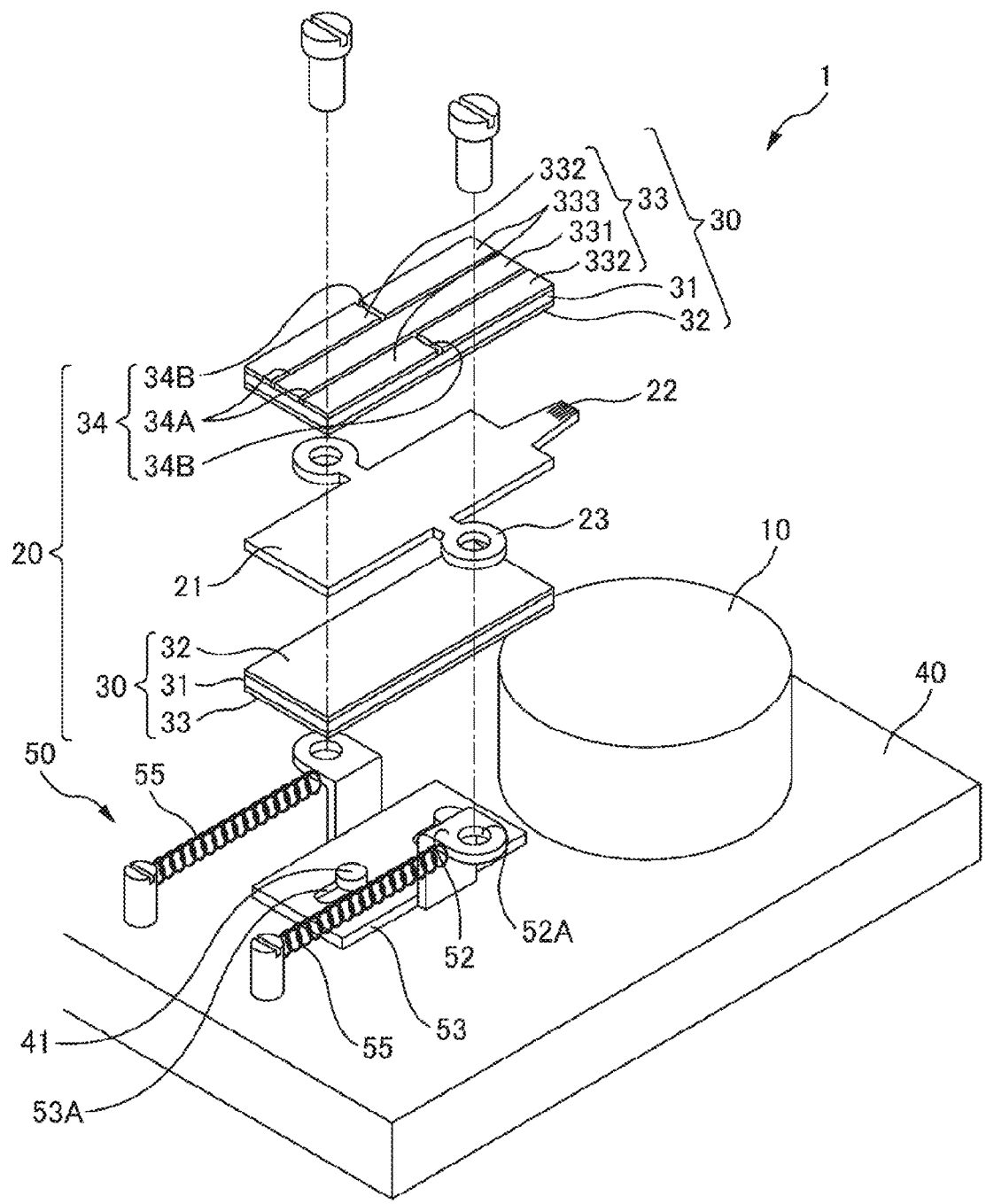
FIG. 1 is an exploded view of a piezoelectric motor.

According to the description of the present specification and the accompanying drawings, at least following items will be apparent.

There will be apparent a piezoelectric motor including a rotating body, a piezoelectric actuator including a protruding section having contact with the rotating body, and adapted to rotate the rotating body due to a motion of the protruding section when driving a piezoelectric element, and a drive circuit adapted to drive the piezoelectric element, wherein the drive circuit includes a drive signal generation section adapted to output a drive signal with a predetermined frequency, and an LC filter adapted to block a frequency higher than the predetermined frequency, and applies the drive signal to the piezoelectric element via the LC filter.

According to such a piezoelectric motor, the advantage of the stabilization of the rotation of the rotating body can synergistically be obtained.

It is preferable that a cutoff frequency of the LC filter is one of equal to and lower than a value four times as high as the predetermined frequency of the drive signal. Thus, the harmonic current specific to the piezoelectric motor can be eliminated.

It is preferable that whether or not a free motion of the protruding section occurs is detected, and if occurrence of the free motion is detected, an amplitude of a voltage of the drive signal is decreased. On this occasion, it is preferable to detect the occurrence of the free motion by detecting the rotation of the rotating body, by detecting the current flowing through the piezoelectric element, or by detecting the back electromotive force of the piezoelectric element.

There will be apparent a drive circuit of a piezoelectric motor, which includes a rotating body, and a piezoelectric actuator including a protruding section having contact with the rotating body, and adapted to rotate the rotating body due to a motion of the protruding section when driving a piezoelectric element, the drive circuit including a drive signal generation section adapted to output a drive signal with a predetermined frequency, and an LC filter adapted to block a frequency higher than the predetermined frequency, wherein the drive signal is applied to the piezoelectric element via the LC filter.

According to such a drive circuit, the advantage of the stabilization of the rotation of the rotating body can synergistically be obtained.

There will be apparent a drive method of a piezoelectric motor including the steps of (A) providing the piezoelectric motor including a rotating body, a piezoelectric actuator including a protruding section having contact with the rotating body, and adapted to rotate the rotating body due to a motion of the protruding section when driving a piezoelectric element, and a drive circuit adapted to drive the piezoelectric element, (B) outputting a drive signal with a predetermined frequency, and (C) applying the drive signal to the piezoelectric element via an LC filter adapted to block a frequency higher than the predetermined frequency.

According to such a drive method of a piezoelectric motor, the advantage of the stabilization of the rotation of the rotating body can synergistically be obtained.

Basic Configuration of Piezoelectric Motor 1

Figure 2:
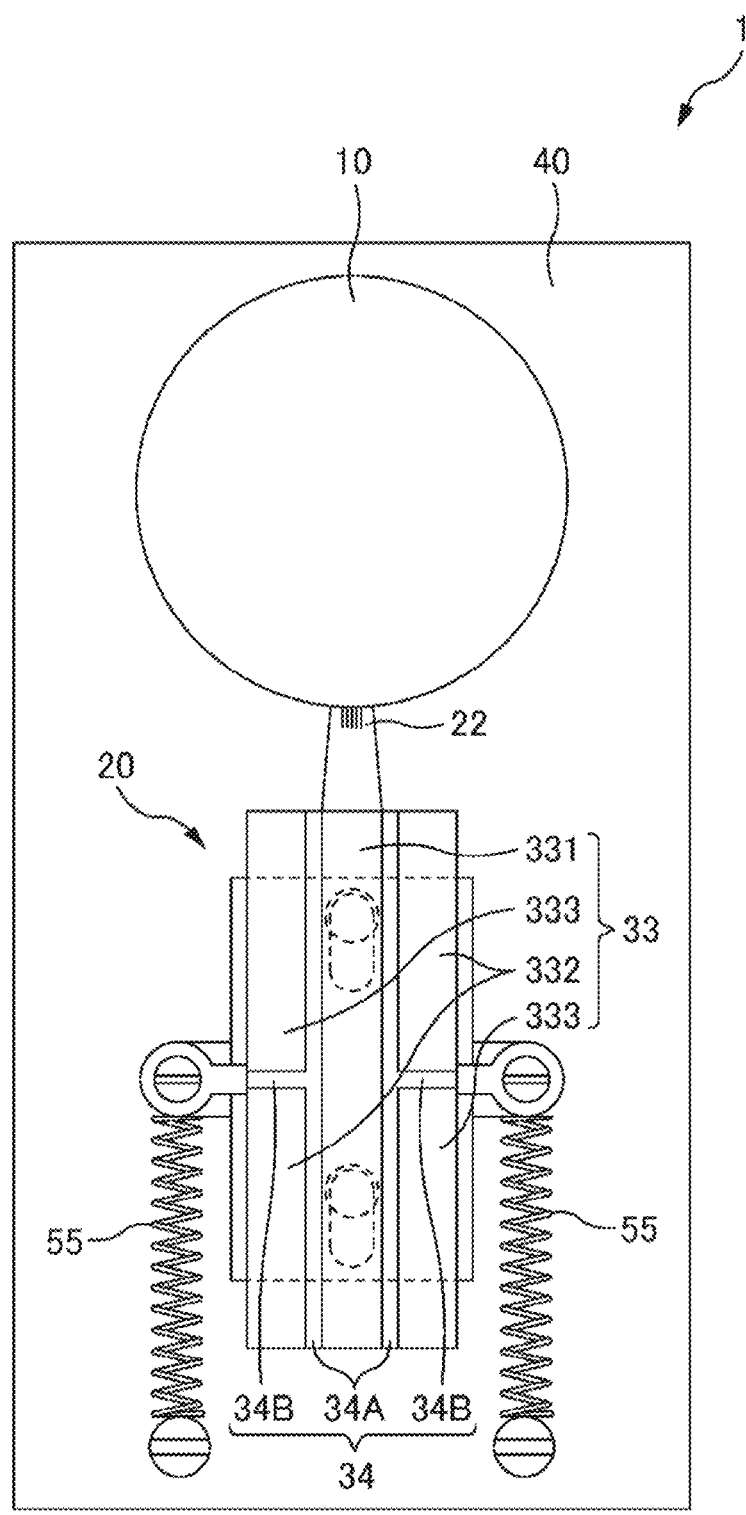
FIG. 2 is a plan view of the piezoelectric motor.
Figure 3:
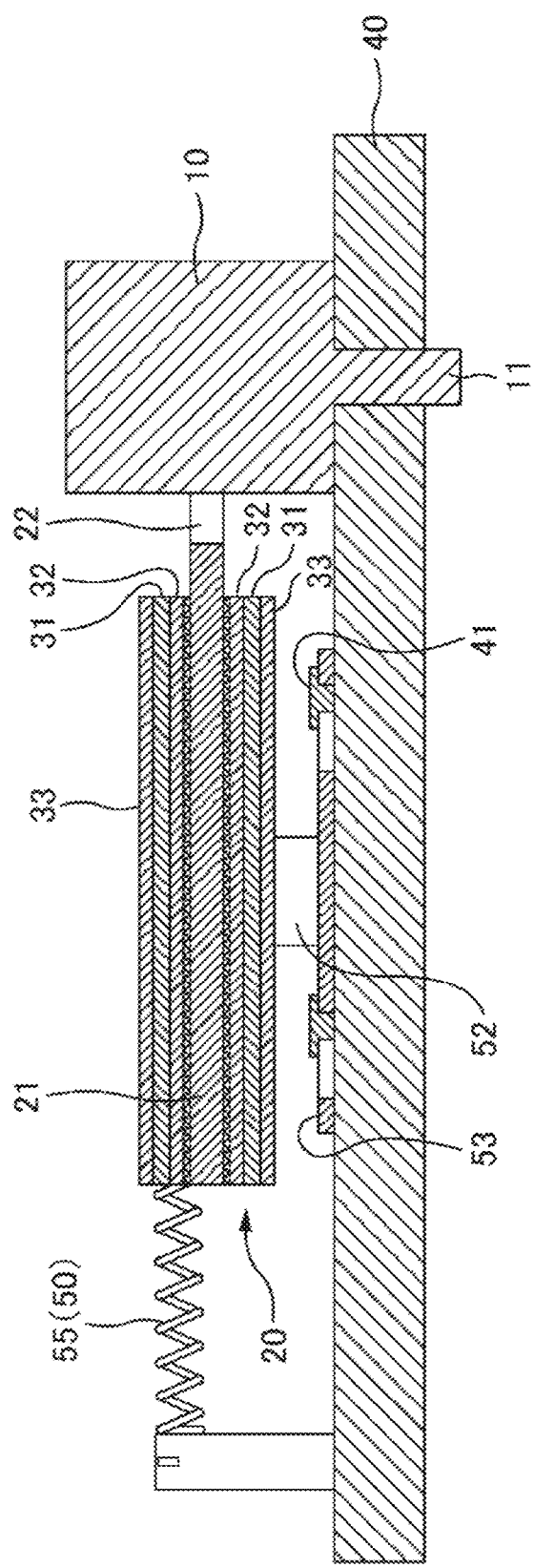
FIG. 3 is a cross-sectional view of the piezoelectric motor.

FIG. 1 is an exploded view of the piezoelectric motor 1. FIG. 2 is a plan view of the piezoelectric motor 1. FIG. 3 is a cross-sectional view of the piezoelectric motor 1.

The piezoelectric motor 1 is provided with a rotating body 10 and a piezoelectric actuator 20. The rotating body 10 is a member capable of rotating around a rotary shaft 11 with respect to a main body 40. The piezoelectric actuator 20 is an actuator for rotating the rotating body 10 using piezoelectric elements 30. In the piezoelectric actuator 20, voltages are applied to the piezoelectric elements 30 to thereby elliptically rotate a protruding section 22, and the protruding section 22 elliptically rotating has contact with a side surface of the rotating body 10 to thereby rotate the rotating body 10.

The piezoelectric actuator 20 is provided with a vibrating member 21 and the piezoelectric elements 30.

The vibrating member 21 has a surface shape roughly the same as that of the piezoelectric elements 30, and at the same time has the protruding section 22 protruding further than the piezoelectric elements 30. The protruding section 22 protrudes toward the rotating body 10, and it results that the protruding section 22 has contact with the side surface of the rotating body 10 while performing the elliptic motion to thereby rotate the rotating body 10.

The piezoelectric elements 30 are drive elements for vibrating the vibrating member 21 in a longitudinal direction and a flexural direction, and are disposed respectively on both of the surfaces of the vibrating member 21. The piezoelectric elements 30 each have a piezoelectric layer 31, a first electrode 32, and a second electrode 33. The first electrode 32 is an electrode disposed on the vibrating member 21 side of the piezoelectric layer 31. The second electrode 33 is an electrode disposed on the piezoelectric layer 31 on the side opposite to the first electrode 32. The first electrode 32 is a common electrode continuously throughout the vibrating member 21 side surface of the piezoelectric layer 31. The second electrode 33 is divided into a plurality of parts in an in-plane direction electrically separated by a groove section 34 from each other.

The groove section 34 dividing the second electrode 33 is composed of first groove sections 34A formed so as to divide the piezoelectric element 30 into three roughly equal parts in the width direction, and second groove sections 34B formed so as to divide outer ones of the three parts of the electrode divided by the first grooves 34A into two roughly equal parts in the longitudinal direction. The central one of the three parts of the electrode divided by the first groove sections 34A forms a longitudinal vibration electrode section 331. The pair of electrodes arranged diagonally across the longitudinal vibration electrode section 331 form flexural vibration electrode sections 332. There are two pairs of electrodes arranged diagonally across the longitudinal vibration electrode section, and in the embodiment, one of the pairs is used as the flexural vibration electrode sections 332, and the other of the pairs is used as detecting electrode sections 333 for the flexural vibration. It should be noted that the detecting electrode sections 333 can also be used as the flexural vibration electrode sections. Further, when reversely rotating the rotating body 10, it is possible to use the flexural vibration electrode sections 332 as the detecting electrode sections, and use the detecting electrode sections 333 as the flexural vibration electrode sections.

Figure 4:
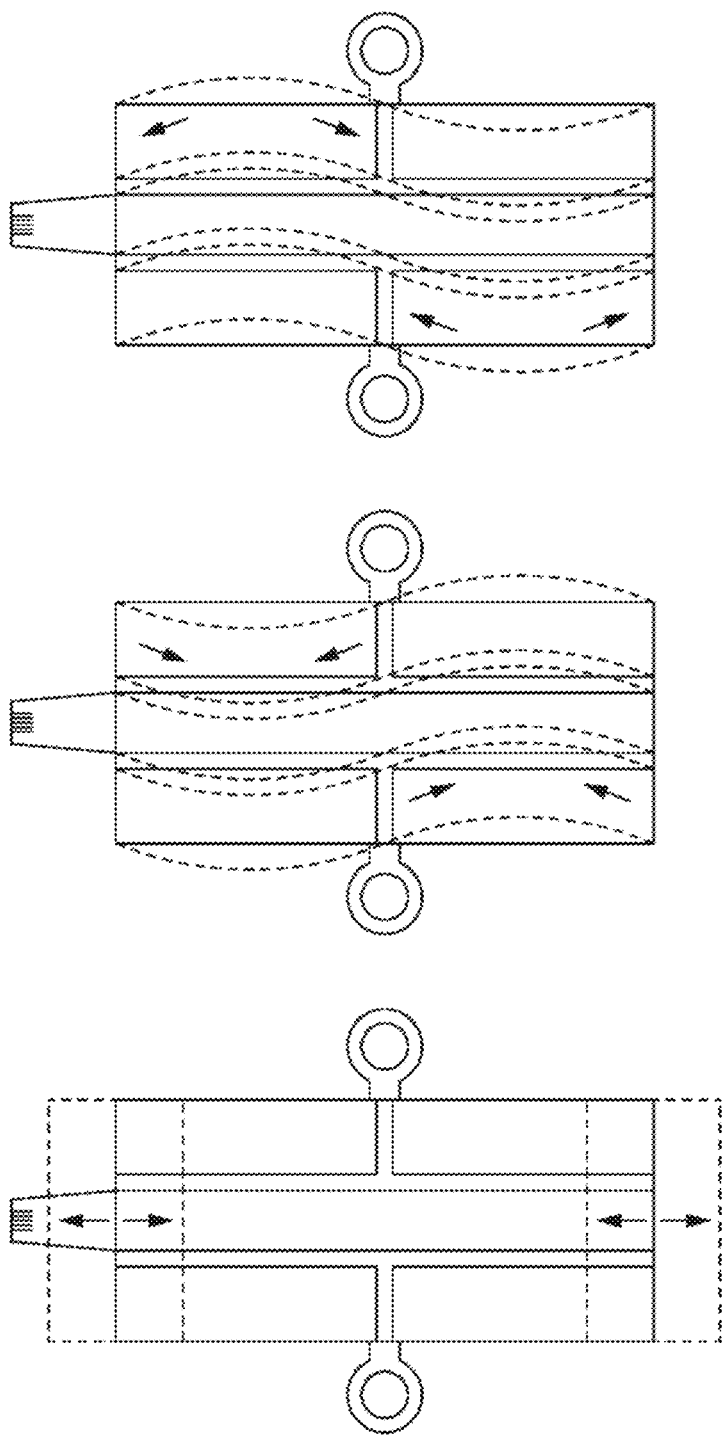
FIG. 4A is an explanatory diagram of a longitudinal vibration.
FIGS. 4B and 4C are explanatory diagrams of a flexural vibration.

FIG. 4A is an explanatory diagram of the longitudinal vibration. By applying a voltage with a predetermined frequency to the longitudinal vibration electrode section 331, the longitudinal vibration shown in the drawing is excited.

FIGS. 4B and 4C are explanatory diagrams of the flexural vibration. By applying a voltage with a predetermined frequency to the flexural vibration electrode sections 332, the flexural vibration shown in the drawing is excited.

Figure 5:
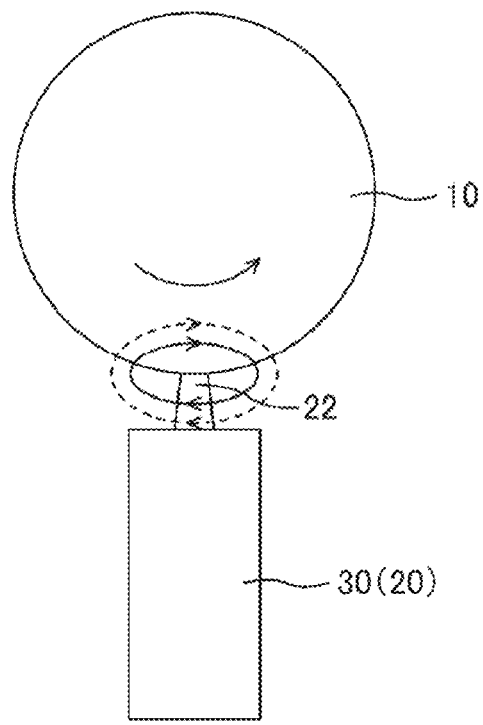
FIG. 5 is an explanatory diagram of an elliptic motion of a protruding section.

FIG. 5 is an explanatory diagram of an elliptic motion of the protruding section 22. By exciting the longitudinal vibration and the flexural vibration in combination with each other, it is possible to make the protruding section 22 perform the elliptic motion as shown in the drawing. In the embodiment, the protruding section 22 is moved elliptically by applying the common voltage to the longitudinal vibration electrode section 331 and the flexural vibration electrode sections 332. It should be noted that it is possible to elliptically move the protruding section 22 by respectively varying the voltages to be applied to the longitudinal vibration electrode section 331 and the flexural vibration electrode sections 332.

Further, by varying the amplitude of the applied voltage, the size of the trajectory of the elliptic motion varies even if the frequency is the same. The higher the applied voltage is, the larger the trajectory of the elliptic motion becomes (see the dotted line in the drawing), and the lower the applied voltage is, the smaller the trajectory of the elliptic motion becomes. In other words, the higher the applied voltage is, the easier to rotate the rotating body 10 becomes, and the lower the applied voltage is, the more difficult to rotate the rotating body 10 becomes.

It should be noted that the piezoelectric motor 1 is provided with a biasing mechanism 50. The biasing mechanism 50 is a mechanism for biasing the piezoelectric actuator 20 toward the rotating body 10 while holding the piezoelectric actuator 20. Since the piezoelectric actuator 20 is pressed against the rotating body 10 by the biasing mechanism 50, the contact between the protruding section 22 of the vibrating member 21 and the rotating body 10 is maintained.

The biasing mechanism 50 has a holding section 51 and springs 55. The holding section 51 is provided with a fixation section 52 for fixing the piezoelectric actuator 20 and a sliding section 53. The fixation section 52 is provided with screw holes 52A for fixing arm sections 23, which protrude in the direction along the shorter side of the vibrating member 21, with screws. The sliding section 53 is provided with an elongated hole 53A, and is guided by a pin 41 protruding from the main body 40. The springs 55 are each an elastic member for biasing the holding section 51 toward the rotating body 10.

The piezoelectric motor 1 is provided with a drive circuit 60 for driving the piezoelectric element 30. Then, a configuration of the drive circuit 60 will be explained.

Drive Circuit 60

COMPARATIVE EXAMPLE

Figure 6:
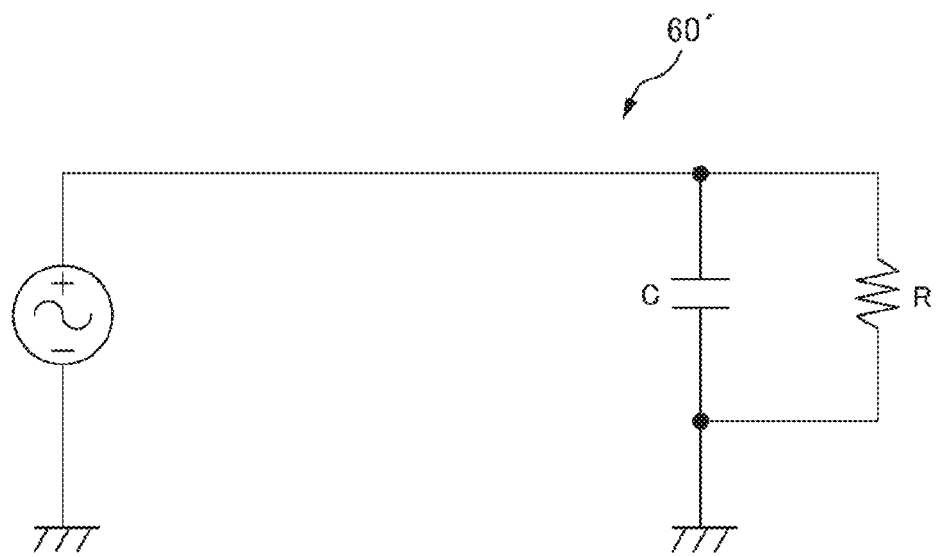
FIG. 6 is an explanatory diagram of a drive circuit of a piezoelectric motor according to a comparative example.

FIG. 6 is an explanatory diagram of a drive circuit 60' of the piezoelectric motor 1 according to a comparative example. In the comparative example, a sinusoidal voltage generated by an alternating-current power supply is directly applied to the piezoelectric element 30.

Here, it is assumed that the piezoelectric motor 1 is equivalent to a circuit composed of a capacitor C and a resistor R connected in parallel to each other. The electric energy of the drive circuit 60' is converted into the kinetic energy of the rotating body 10 in the circuit composed of the capacitor C and the resistor R connected in parallel to each other. The state in which the rotational speed of the rotating body 10 is low is equivalent to the state in which the motional impedance of the circuit composed of the capacitor C and the resistor R connected in parallel to each other is high. In contrast, the state in which the rotational speed of the rotating body 10 is high is equivalent to the state in which the motional impedance of the circuit composed of the capacitor C and the resistor R connected in parallel to each other is low.

Figure 7A:
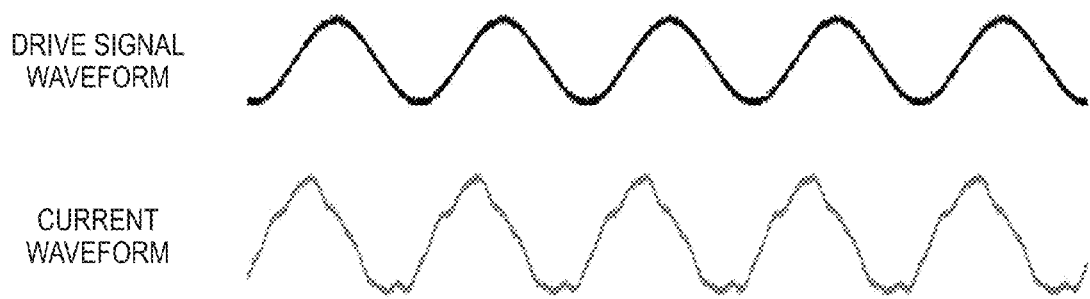
FIGS. 7A and 7B are explanatory diagrams of waveforms in a drive period in the comparative example.
Figure 7B:
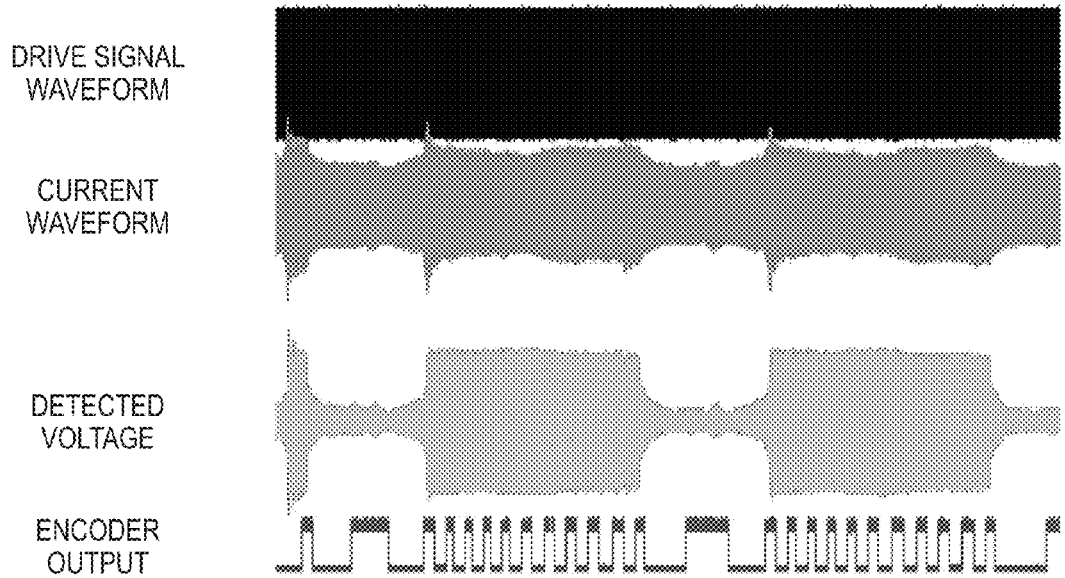

FIGS. 7A and 7B are explanatory diagrams of waveforms in a drive period in the comparative example. Both of the horizontal axes of FIGS. 7A and 7B represent time, wherein the time axis of FIG. 7B shows a longer term than the term shown in FIG. 7A. The vertical axes of FIGS. 7A and 7B represent voltage or current. The "DRIVE SIGNAL WAVEFORM" in FIG. 7A and the "DRIVE SIGNAL WAVEFORM" in FIG. 7B each show the waveform of the voltage applied to the piezoelectric element 30 (the graphs are the same as each other but are different in time axis from each other). The "CURRENT WAVEFORM" in FIG. 7A and the "CURRENT WAVEFORM" in FIG. 7B each show the waveform of the current flowing through the piezoelectric element 30 (the graphs are the same as each other but are different in time axis from each other). The "DETECTED VOLTAGE" in FIG. 7B is a graph of a back electromotive force generated between the detecting electrode sections 333 of the piezoelectric element 30. In other words, the "DETECTED VOLTAGE" in FIG. 7B represents a drive condition of the piezoelectric element 30. The "ENCODER OUTPUT" in FIG. 7B represents the output of an encoder provided to the rotary shaft 11 of the rotating body 10. In other words, the "ENCODER OUTPUT" in FIG. 7B represents a rotational condition of the rotating body 10.

The sinusoidal voltage at 250 kHz is applied to the piezoelectric element 30 (see the "DRIVE SIGNAL WAVEFORM" shown in FIG. 7A). It should be noted that the current flowing through the piezoelectric element 30 is distorted as can be understood in view of the "CURRENT WAVEFORM" in FIG. 7A.

It is possible that the reason that the current waveform of the piezoelectric element 30 is distorted is that the back electromotive force occurs in the piezoelectric element 30 due to the reactive force caused by the contact between the protruding section 22 and the side surface of the rotating body 10 since the protruding section 22 is moved elliptically to have contact with the side surface of the rotating body 10 when the piezoelectric motor 1 rotates the rotating body 10. The phenomenon that the current waveform is distorted in such a manner is a phenomenon specific to the piezoelectric motor 1.

Figure 8A:
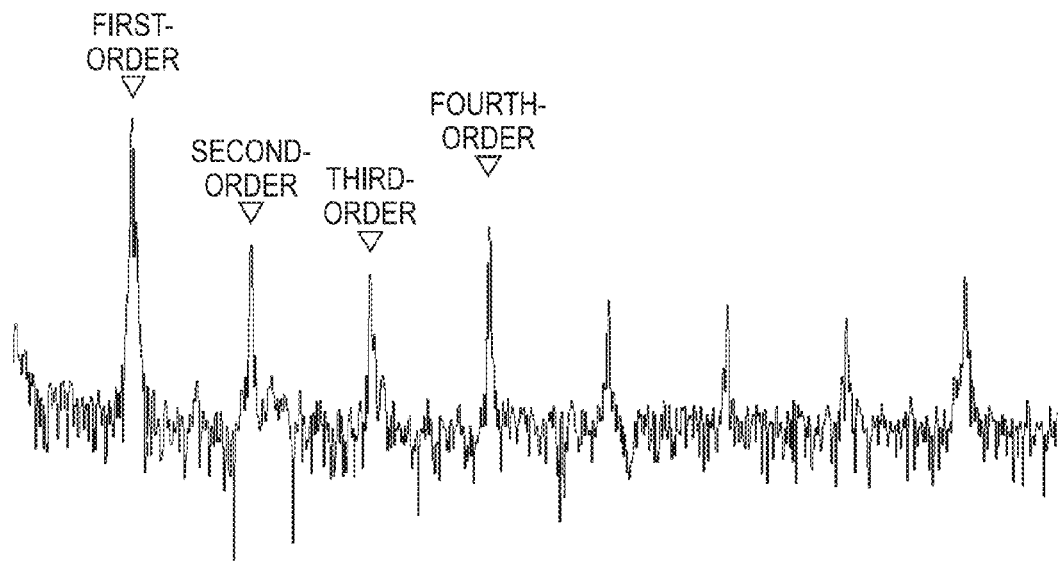
FIG. 8A is a graph showing a result of FFT of the current waveform shown in FIG. 7A.
Figure 8B:
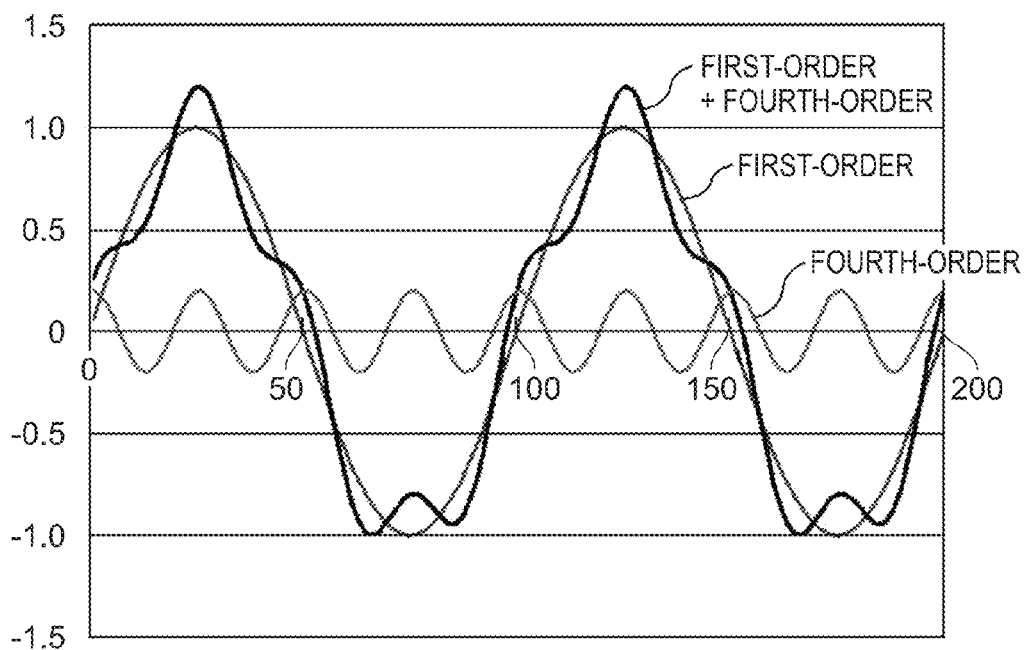
FIG. 8B is a graph showing a result of a simulation of superimposing a first-order frequency component and a fourth-order frequency component each other based on the result of FFT.

FIG. 8A is a graph showing a result of FFT of the current waveform shown in FIG. 7A. FIG. 8B is a graph showing a result of a simulation of superimposing a first-order frequency component and a fourth-order frequency component each other based on the result of FFT.

As shown in these graphs, the current flowing through the piezoelectric element 30 includes a current with a basic frequency of 250 kHz and a current with a frequency component four times as high as the basic frequency superimposed thereon. The frequency component four times as high as the basic frequency is at −12 dB with respect to the basic frequency, and shows a higher value compared to a level of −38 dB of a frequency component twice as high as the basic frequency. In other words, it is possible that the primary cause of the distortion of the current waveform specific to the piezoelectric motor 1 is the forth-order harmonic.

It is possible that if the current flowing through the piezoelectric element 30 is distorted, the piezoelectric element 30 causes an abnormal vibration, and the trajectories of the elliptic motion of the protruding section 22 shown in FIG. 5 are also distorted. As a result, the smooth rotation of the rotating body 10 might be damaged.

In addition, in the drive circuit 60' of the comparative example, there occurs the phenomenon that the rotating body 10 becomes easy to stop if the smooth rotation of the rotating body 10 is once damaged. Hereinafter, the phenomenon will be explained.

The state in which the rotational speed of the rotating body 10 decreases corresponds to the state in which the motional impedance of the circuit composed of the capacitor C and the resistor R connected in parallel to each other shown in FIG. 6 is high (the state in which the resistance value is high). If the motional impedance rises, the amplitude of the current flowing through the piezoelectric element 30 decreases, the trajectory of the elliptical motion of the protruding section 22 shrinks, and further the rotating body 10 becomes difficult to rotate. For example, in FIG. 7B, in the drive circuit 60' of the comparative example, when the rotational speed of the rotating body 10 decreases (when the pulse width of the "ENCODER OUTPUT" in the drawing is large), the amplitude of the current waveform decreases, and the amplitude of the detected voltage decreases dramatically (the flexural deformation of the piezoelectric element 30 decreases). As a result, in the drive circuit 60' of the comparative example, if the smooth rotation of the rotating body 10 is once damaged, the rotating body 10 becomes easy to stop.

Figures 9, 10:
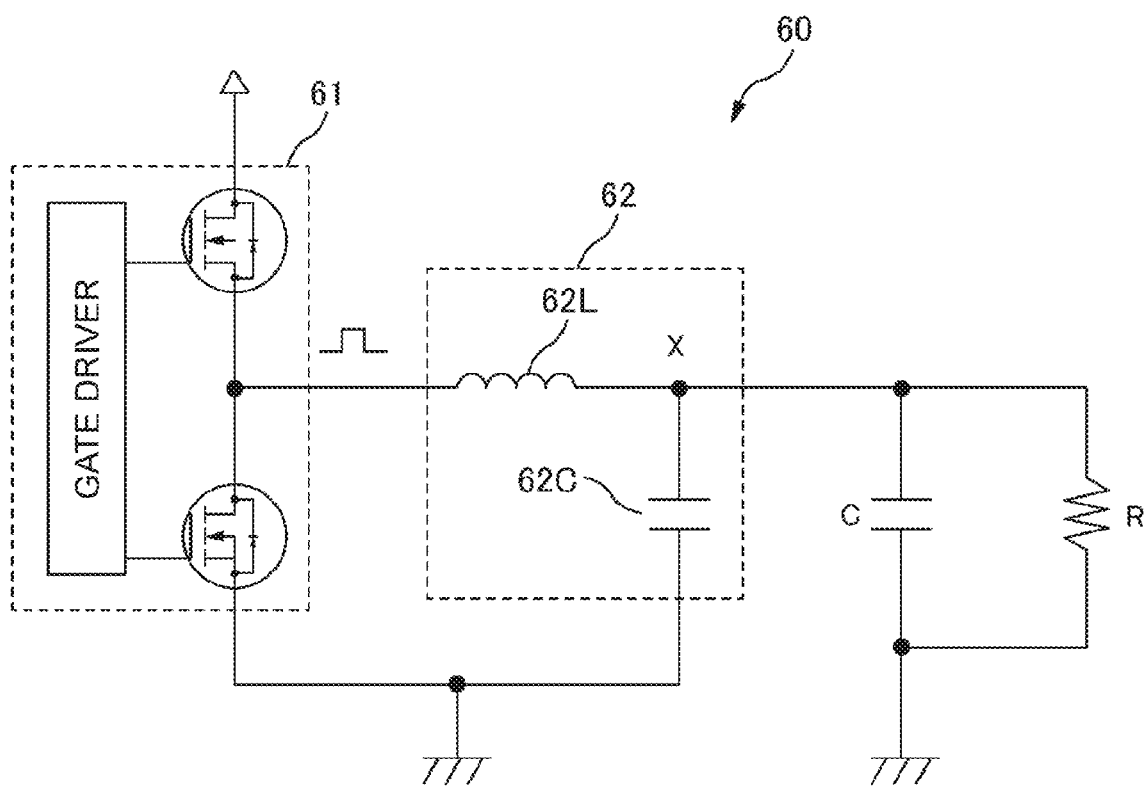
FIG. 9 is a table of equivalent characteristics corresponding to a rotational speed in the case of the comparative example.
FIG. 10 is an explanatory diagram of a drive circuit of a piezoelectric motor according to an embodiment of the invention.

FIG. 9 is a table of equivalent characteristics corresponding to the rotational speed in the case of the comparative example. Here, the state in which the rotational speed of the rotating body 10 is high and the state in which the rotational speed thereof is low are reproduced by applying a load to the rotating body 10, and the motional impedance at that moment is measured, and thus the energy consumed in the resistance R of the drive circuit 60' of the comparative example is evaluated. Here, the voltage amplitude of the alternating-current power supply is 16 V (±8 V). The power consumption in the case in which the rotational speed is low exhibits a value lower than that in the case in which the rotation speed is high. The evaluation result also shows the fact that if the rotational speed of the rotating body 10 decreases, the rotating body 10 becomes more difficult to rotate. As described above, in the drive circuit 60' of the comparative example, if the smooth rotation of the rotating body 10 is once damaged, the rotating body 10 becomes easy to stop.

Embodiment

FIG. 10 is an explanatory diagram of the drive circuit 60 of the piezoelectric motor 1 according to the embodiment. The drive circuit 60 of the embodiment is provided with a switching circuit 61 and an LC filter 62. The switching circuit 61 is a drive signal generation section for outputting a rectangular wave (corresponding to the drive signal) at a predetermined frequency. The LC filter 62 is disposed between the switching circuit 61 and the piezoelectric element 30. In other wards, the rectangular wave output by the switching circuit 61 is applied to the piezoelectric element 30 via the LC filter 62.

The LC filter 62 is composed of an inductor 62L and a capacitor 62C. The inductor 62L is connected in series to the piezoelectric element 30. In other words, one end of the inductor 62L is connected to an output terminal of the switching circuit 61, and the other end thereof is connected to an electrode of the piezoelectric element 30. The capacitor 62C is connected in parallel to the piezoelectric element 30. Here, one end of the capacitor 62C is connected to a connection point X between the inductor 62L and the piezoelectric element 30, and the other end thereof is grounded.

FIGS. 11A and 11B are explanatory diagrams of waveforms in the drive period in the embodiment. Both of the horizontal axes of FIGS. 11A and 11B represent time, wherein the time axis of FIG. 11B shows a longer term than the term shown in FIG. 11A. The vertical axes of FIGS. 11A and 11B represent voltage or current. The "DRIVE SIGNAL WAVEFORM" in FIG. 11A and the "DRIVE SIGNAL WAVEFORM" in FIG. 11B each show the waveform of the voltage applied to the piezoelectric element 30 by the switching circuit 61 via the LC filter 62 (the graphs are the same as each other but are different in time axis from each other). The "CURRENT WAVEFORM" in FIG. 11A and the "CURRENT WAVEFORM" in FIG. 11B each show the waveform of the current flowing through the piezoelectric element 30 (the graphs are the same as each other but are different in time axis from each other). The "DETECTED VOLTAGE" in FIG. 11B is a graph of a back electromotive force generated between the detecting electrode sections 333 of the piezoelectric actuator 20. In other words, the "DETECTED VOLTAGE" in FIG. 11B represents a drive condition of the piezoelectric element 30.

The switching circuit 61 outputs a rectangular wave voltage (0 V/5 V) at 250 kHz (see the "DRIVE SIGNAL WAVEFORM" in FIG. 11A). The LC filter 62 is a low-pass filter for blocking (attenuating) the frequency higher than the frequency of the rectangular wave output from the switching circuit 61, and changes the rectangular wave to a sinusoidal wave. Here, the inductor 62L of the LC filter 62 has a inductance of 100 µH, and the capacitor 62C has a capacitance of 2.2 nF, and thus, the cutoff frequency is set to 340 kHz. Since the cutoff frequency of the LC filter 62 is equal to or lower than the value twice as high as the drive frequency (250 kHz), the LC filter 62 is capable of eliminating the fourth-order harmonic component. Since the fourth-order harmonic is eliminated, the current flowing through the piezoelectric element 30 has a shape of a distortionless sinusoidal wave as can be understood in view of the "CURRENT WAVEFORM" in FIG. 11A.

In the present embodiment, since the cutoff frequency of the LC filter 62 is equal to or lower than a value twice as high as the drive frequency (250 kHz), it is possible to eliminate not only the fourth-order harmonic component but also the second-order harmonic component and the third-order harmonic component (since the piezoelectric motor 1 is driven by resonating the piezoelectric actuator 20, the second-order harmonic component and the third-order harmonic component are also generated, and the generation of these harmonics is also a phenomenon specific to the piezoelectric motor 1). It should be noted that in order to eliminate the forth-order harmonic component having the most significant influence, it is sufficient that the cutoff frequency of the LC filter 62 is equal to or lower than a value four times as high as the drive frequency (250 kHz).

In the embodiment, since the distortionless sinusoidal current flows through the piezoelectric element 30, it is possible that the protruding section 22 makes a motion of drawing a distortionless ellipse even if the protruding section 22 has contact with the rotating body 10 and thus the reactive force is applied to the protruding section 22. Thus, the rotation of the rotating body 10 becomes smooth.

In addition, in the drive circuit 60 according to the embodiment, even if the smooth rotation of the rotating body 10 is once damaged due to some environmental change, the negative feedback acts so as to stabilize the rotation of the rotating body 10. Hereinafter, this point will be explained.

The state in which the rotating body 10 is difficult to rotate (the state in which the rotational speed of the rotating body 10 decreases) corresponds to the state in which the motional impedance of the circuit composed of the capacitor C and the resistor R connected in parallel to each other shown in FIG. 10 is high (the state in which the resistance value is high). As a result, the voltage amplitude at the connection point X increases due to the action of the inductor 62L of the LC filter 62. If the voltage amplitude at the connection point X increases, the trajectory of the elliptic motion of the protruding section 22 enlarges, and thus the contact pressure between the protruding section 22 and the rotating body 10 increases. If the contact pressure between the protruding section 22 and the rotating body 10 increases, the force transmitted to the rotating body 10 increases, and thus the rotational speed of the rotating body 10 is restored, and the resistance value in FIG. 10 is restored (decreased in this case).

It should be noted that the state in which the rotating body 10 is easy to rotate (the state in which the rotational speed of the rotating body 10 increases) corresponds to the state in which the motional impedance of the circuit composed of the capacitor C and the resistor R connected in parallel to each other shown in FIG. 10 is low (the state in which the resistance value is low). As a result, the voltage amplitude at the connection point X decreases due to the action of the inductor 62L of the LC filter 62. If the voltage amplitude at the connection point X decreases, the trajectory of the elliptic motion of the protruding section shrinks, and thus the contact pressure between the protruding section 22 and the rotating body 10 decreases. If the contact pressure between the protruding section 22 and the rotating body 10 decreases, the force transmitted to the rotating body 10 decreases, and thus the rotational speed of the rotating body 10 is restored, and the resistance value in FIG. 10 is restored (increased in this case).

As described above, in the drive circuit 60 according to the embodiment, even if the rotational speed of the rotating body 10 varies, the negative feedback acts so as to restore the rotational speed of the rotating body 10.

FIG. 12 is a table of equivalent characteristics corresponding to the rotational speed in the case of the embodiment. Similarly to the comparative example, the state in which the rotational speed of the rotating body 10 is high and the state in which the rotational speed thereof is low are reproduced by applying a load to the rotating body 10, and the motional impedance at that moment is measured, and thus the energy consumed in the resistance R of the drive circuit 60 of the embodiment is evaluated. Here, the rectangular wave output from the switching circuit 61 is assumed to be a wave with 250 kHz (0 V/3 V).

When the rotational speed is high, the capacitor C takes a capacitance of 1.006 nF, and the resistor R takes a resistance of 278.6Ω. In contrast, when the rotational speed is low, the capacitor C takes a capacitance of 2.14 nF, and the resistor R takes a resistance of 628.3Ω. In other words, it is measured that the state in which the motional impedance of the circuit composed of the capacitor C and the resistor R connected in parallel to each other (the state in which the resistance value is high) appears if the rotational speed decreases.

Further, when the rotational speed is high, the voltage amplitude at the connection point X takes 2.2 V, and the energy ($=V^2/R$) consumed in the resistor R takes 18.1 mW. In contrast, when the rotational speed is low, the voltage amplitude at the connection point X takes 5.1 V, and the energy consumed in the resistor R takes 41.9 mW. In other words, if the rotational speed decreases, it results that the energy consumed in the resistor R increases, and there appears an action of restoring the rotational speed of the rotating body 10. However, according to the drive circuit 60 of the embodiment, since the negative feedback works before the difference in speed shown in FIG. 12 occurs, the difference in power consumption shown in FIG. 12 does not occur from the beginning.

According to the embodiment, the drive circuit 60 is provided with the switching circuit 61 (corresponding to the drive signal generation section) for outputting the rectangular wave (corresponding to the drive signal) with a predetermined frequency and the LC filter 62 for blocking the frequency higher than the frequency of the rectangular wave, and applies the rectangular wave to the piezoelectric element 30 via the LC filter 62. Thus, the distortion of the current specific to the piezoelectric motor 1 can be eliminated to thereby smooth the rotation of the rotating body 10. Further, since the negative feedback works due to the use of the LC filter 62, the rotation of the rotating body 10 is stabilized even if the smooth rotation of the rotating body 10 is once damaged. In other words, by applying the LC filter 62 to the piezoelectric motor 1, the advantage of the stabilization of the rotation of the rotating body 10 can synergistically be obtained.

Further, according to the embodiment, the cutoff frequency of the LC filter 62 is set to 340 kHz, which is equal to or lower than a value four times as high as the frequency (e.g., 250 kHz) of the frequency of the rectangular wave. Thus, it is possible to eliminate the principal harmonic current (the fourth-order harmonic current) flowing through the piezoelectric element 30.

It should be noted that the cutoff frequency of the LC filter 62 can be equal to or lower than a value twice as high as the frequency of the rectangular wave. Also in this case, the principal harmonic current (the fourth-order harmonic current) flowing through the piezoelectric element 30 can be eliminated, and at the same time, the second-order harmonic component and the third-order harmonic component can also be eliminated.

Further, according to the embodiment, since the drive signal is the rectangular wave, the drive signal generation section is formed of the switching circuit 61. It should be noted that the drive signal output from the drive signal generation section is not limited to the rectangular wave, but can be another waveform (e.g., a sinusoidal wave).

Modified Example

In the explanation described above, by applying the load to the rotating body 10, the state in which the motional impedance is high is reproduced. In such a case, the voltage amplitude at the connection point X increases, the trajectory of the elliptic motion of the protruding section 22 enlarges, the contact pressure between the protruding section 22 and the rotating body 10 increases, and the rotation of the rotating body 10 is stabilized (the negative feedback works).

In contrast, also in the case in which the protruding section 22 is moving free (if the protruding section 22 is slipping on the rotating body 10), the rotating body 10 is difficult to rotate, and therefore, there appears the state in which the motional impedance is high. It should be noted that if the trajectory of the elliptic motion of the protruding section 22 enlarges when the protruding section 22 is moving free, there is a possibility that the protruding section 22 slips more badly.

Therefore, the piezoelectric motor 1 according to the modified example detects the free motion of the protruding section 22, and then decreases the amplitude of the rectangular wave voltage output from the switching circuit 61 once if the free motion of the protruding section 22 is detected. By decreasing the amplitude of the rectangular wave voltage, the trajectory of the elliptic motion shrinks, and the slip of the protruding section 22 on the rotating body 10 is resolved. Then, after the free motion is stopped, the piezoelectric motor 1 gradually restores the amplitude of the rectangular wave voltage.

As a first method of detecting the free motion of the protruding section 22, it is possible to provide an encoder to the rotary shaft 11 of the rotating body 10, and then detect the rotation of the rotating body 10 based on the output of the encoder. In this case, by detecting the fact that the rotating body 10 fails to rotate using the encoder when driving the piezoelectric motor 1, the free motion of the protruding section 22 can be detected.

As a second method of detecting the free motion of the protruding section 22, it is possible to detect the current flowing through the piezoelectric element 30. In this case, the amplitude of the current of the piezoelectric element 30 is detected, and it is possible to determine that there is no free motion if the current amplitude of the piezoelectric element 30 is equal to or lower than a predetermined value, and to determine that there is a free motion if the current amplitude of the piezoelectric element 30 is equal to or higher than a predetermined value. Alternatively, it is possible to detect the phase of the current of the piezoelectric element 30, and to determine that there is a free motion if the phase of the current of the piezoelectric element 30 is shifted 90 degrees from the phase of the drive signal (it should be noted that if there is a free motion, the resistance value of the parallel circuit of the capacitor C and the resistor R shown in FIG. 10 is approximately zero, and therefore the phase difference between the current and the voltage takes 90 degrees).

As a third method of detecting the free motion of the protruding section 22, it is possible to detect the back electromotive force generated in the piezoelectric element 30 using the detecting electrode sections 333 of the piezoelectric element 30. Also in the third method, the free motion can be detected based on the amplitude or the phase of the back electromotive force of the detecting electrode sections 333 similarly to the second method.

According to the modified example, since the voltage amplitude of the rectangular wave (the drive signal) is decreased when the free motion is detected, it is possible to eliminate the free motion.

Other Issues

The embodiments described above are for facilitating understanding of the invention, but not for providing limited interpretations of the invention. It is obvious that the invention can be modified or improved within the scope and the spirit thereof, and can include equivalents thereof.

The entire disclosure of Japanese Patent Application No. 2012-094975, filed Apr. 18, 2012, is expressly incorporated by reference herein.

What is claimed is:

1. A piezoelectric motor comprising:
   a rotating body;
   a piezoelectric actuator including a protruding section having contact with the rotating body, and adapted to rotate the rotating body due to a motion of the protruding section when driving a piezoelectric element; and a drive circuit adapted to drive the piezoelectric element, wherein the drive circuit includes:

a drive signal generation section adapted to output a drive signal with a predetermined frequency, and an LC filter adapted to block a frequency higher than the predetermined frequency, an inductance of the LC filter being connected in series to the piezoelectric actuator and a capacitance of the LC filter being connected in parallel to the piezoelectric actuator, and applies the drive signal to the piezoelectric element via the LC filter, wherein the LC filter stabilizes a rotation of the rotating body, wherein a first end of the inductance is connected to an output of the drive signal generation section and a second end of the inductance is connected to an electrode of the piezoelectric actuator.

2. The piezoelectric motor according to claim 1, wherein a cutoff frequency of the LC filter is one of equal to and lower than a value four times as high as the predetermined frequency of the drive signal.

3. The piezoelectric motor according to claim 1, wherein whether or not a free motion of the protruding section occurs is detected, and if occurrence of the free motion is detected, an amplitude of a voltage of the drive signal is decreased.

4. The piezoelectric motor according to claim 3, wherein whether or not the free motion occurs is detected by detecting rotation of the rotating body.

5. The piezoelectric motor according to claim 3, wherein whether or not the free motion occurs is detected by detecting a current flowing through the piezoelectric element.

6. The piezoelectric motor according to claim 3, wherein whether or not the free motion occurs is detected by detecting a back electromotive force of the piezoelectric element.

7. The piezoelectric motor according to claim 1, wherein the piezoelectric actuator is configured to rotate the rotating body due to an elliptical motion of the protruding section when driving the piezoelectric element.

8. A drive circuit of a piezoelectric motor including
a rotating body, and
a piezoelectric actuator including a protruding section having contact with the rotating body, and adapted to rotate the rotating body due to a motion of the protruding section when driving a piezoelectric element,
the drive circuit comprising:

a drive signal generation section adapted to output a drive signal with a predetermined frequency; and an LC filter adapted to block a frequency higher than the predetermined frequency, an inductance of the LC filter being connected in series to the piezoelectric actuator and a capacitance of the LC filter being connected in parallel to the piezoelectric actuator, wherein the LC filter applies the drive signal, with the predetermined frequency and a rectangular form, to the piezoelectric element, wherein the LC filter stabilizes a rotation of the rotating body to restore a rotational speed of the rotating body, wherein a first end of the inductance is connected to an output of the drive signal generation section and a second end of the inductance is connected to an electrode of the piezoelectric actuator.

9. The drive circuit according to claim 8, wherein the piezoelectric actuator is configured to rotate the rotating body due to an elliptical motion of the protruding section when driving the piezoelectric element.

10. A drive method of a piezoelectric motor, comprising:

(A) providing the piezoelectric motor including
a rotating body,
a piezoelectric actuator including a protruding section having contact with the rotating body, and adapted to rotate the rotating body due to a motion of the protruding section when driving a piezoelectric element, and
a drive circuit adapted to drive the piezoelectric element, (B) outputting a drive signal with a predetermined frequency; and (C) applying the drive signal to the piezoelectric element via an LC filter adapted to block a frequency higher than the predetermined frequency, an inductance of the LC filter being connected in series to the piezoelectric element and a capacitance of the LC filter being connected in parallel to the piezoelectric element, wherein the LC filter stabilizes a rotation of the rotating body from changes in a motional impedance of the LC filter resulting from changes in contact pressure of the protruding section with the rotating body, wherein a first end of the inductance is connected to an output of the drive signal generation section and a second end of the inductance is connected to an electrode of the piezoelectric actuator.

11. The drive method according to claim 10, wherein the piezoelectric actuator is configured to rotate the rotating body due to an elliptical motion of the protruding section when driving the piezoelectric element.

12. The method according to claim 11, wherein applying the drive signal to the piezoelectric element via the LC filter comprises applying the drive signal to induce the elliptical motion of the protruding section.

* * * * *